United States Patent
Kuznicki et al.

(12) 
(10) Patent No.: US 6,379,436 B1
(45) Date of Patent: Apr. 30, 2002

(54) MACROPORAUS ALUMINOSILICATE DESICCANT, PREPARATION FROM SODALITE AND USE IN ENTHALPY ENERGY WHEELS

(75) Inventors: Steven M. Kuznicki, Whitehouse Station; Tadeusz W. Langner, Linden; Jacqueline S. Curran, Cranford; Valerie A. Bell, Edison, all of NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/548,045

(22) Filed: Apr. 12, 2000

(51) Int. Cl.$^7$ .......................... B01D 53/04; B01D 53/28
(52) U.S. Cl. .............................. 96/125; 96/130; 502/81; 502/83
(58) Field of Search ........................... 95/113, 117, 118, 95/123, 126, 902; 96/108, 125, 130; 502/60, 81, 83

(56) References Cited

U.S. PATENT DOCUMENTS

| | | | | |
|---|---|---|---|---|
| 4,529,416 A | * | 7/1985 | Sircar et al. ............... | 502/83 X |
| 4,769,053 A | | 9/1988 | Fischer et al. ................ | 55/389 |
| 5,220,086 A | * | 6/1993 | Rodewald ................. | 502/83 X |
| 5,300,138 A | * | 4/1994 | Fischer et al. ............. | 95/117 X |
| 5,512,083 A | * | 4/1996 | Dunne ......................... | 95/113 |
| 5,536,301 A | * | 7/1996 | Lansbarkis et al. .......... | 95/117 |
| 5,667,560 A | * | 9/1997 | Dunne ......................... | 95/113 |

FOREIGN PATENT DOCUMENTS

| | | | | |
|---|---|---|---|---|
| JP | 58-036638 | * | 3/1983 | .................. 502/83 |

* cited by examiner

Primary Examiner—Robert H. Spitzer
(74) Attorney, Agent, or Firm—Stephen I Miller

(57) ABSTRACT

Sodalite is treated with acid to transform the surface to provide a highly macroporous material that demonstrates water swing capacities exceeding those of high performance, low temperature desiccants under high latent load at relatively high ambient temperature and humidities.

12 Claims, 7 Drawing Sheets

Figure 1. SEM of sodalite (top) and acid-treated sodalite (bottom).

Figure 3
Acid Treated Material, H2O Isotherm
With Fast "Swing Rate"-Type Sorption Figure 5
Water Isotherm Shapes
Acid Treated Sodalite Does Not Act Like
A Molecular Sieve (In Swing Conditions)

Figure 7
Water Swing Capacity Tracks The Macroporosity Measured By N2

MACROPORAUS ALUMINOSILICATE DESICCANT, PREPARATION FROM SODALITE AND USE IN ENTHALPY ENERGY WHEELS

FIELD OF THE INVENTION

This invention relates to novel aluminosilicate desiccants and to their manufacture by controlled acid treatment of hydroxysodalite. The invention also relates to the preferred use of the desiccants in enthalpy air to air rotary energy exchangers.

Ambient air contains two separate substantial energy components: sensible (temperature) and latent (humidity) heat. Enthalpy or total energy recovery involves combining heat exchange with latent energy or humidity exchange. Conventional heat exchange is well-established and widely practiced. This procedure effectively exchanges sensible heat and may serve as a barrier which transfers sensible heat between two streams. This may be accomplished by a variety of techniques including a turning wheel. The concept of enthalpy exchange or total energy recovery involves simultaneous sensible and latent heat transfer. This requires applying a desiccant to a heat exchange system to transfer that latent component by adsorbing and desorbing humidity. This combined energy transfer is particularly well-suited for a turning wheel device. If a completely effective enthalpy wheel were available, outdoor air could be drawn into a room while "stale" air was exhausted without changing the interior latent or sensible energy levels. The practical result would be fresh air in the summer without additional cooling and fresh air in the winter without additional heating.

In order for a desiccant to be applied to an enthalpy recovery system, it must be extremely responsive to temperature and humidity changes near ambient conditions. Additionally, it should not adsorb molecules larger than water, in that their exchange could result in a build-up of contaminants in the conditioning space. The current desiccant of choice for enthalpy recovery applications is Zeolite 3A. The teachings of U.S. Pat. No. 4,769,053 (Fisher) are incorporated herein by cross-reference. A non-classical zeolite, titanium silicate ETS-10 supplied by Engelhard Corporation, has recently been used for this application.

In principle, Zeolite 3A may act as a barrier for moisture between indoor and outdoor environments by acting as a reversible desiccant. Unfortunately, as would be expected from classical aluminosilicate zeolites, Zeolite 3A binds water very strongly and would be expected to "swing" negligible amounts of water under the very mild temperature and humidity perturbations seen by an enthalpy wheel. Thus, while Zeolite 3A may exclude most species larger than water, its basic desiccant characteristics leave much to be desired for these types of applications. While expressing more desirable desiccant properties than Zeolite 3A, if absolute exclusion of other molecules is desired, the approximately 8 Angstrom pore size of ETS-10 is too large. In principle, a wide spectrum of molecules may fit through its relatively large pore and be retained by the adsorbent.

SUMMARY OF THE INVENTION

We have discovered that hydroxysodalite, a dense aluminosilicate having pores smaller than the 2.8 Angstrom diameter of water, can be transformed into a novel less dense macroporous structure by a controlled acid treatment.

The novel macroporous structure is a material that still contains sodalite cages but has also formed macropores that have a broad range of pore sizes including many large pores. In fact, nitrogen sorption tests show that the novel acid treated sodalite of this invention contains pores ranging from 20 to 500 Angstroms in diameter. The sample shown in the pore size distribution data in FIG. 2 has a cumulative pore volume of 0.12 cc/g between said 20 to 500 Angstroms pore diameter. Half of this pore volume is in pores greater than 150 Angstroms diameter. There is an additional 0.03 cc/g more pore volume between 500 to 2500 Angstroms.

Other acid treated sodalite samples of this invention have a cumulative pore volume between 20 to 500 Angstrom diameters of at least 0.04 cc/g, preferably at least 0.08 cc/g and as high as 0.15 cc/g. This contrasts to sodalite with 0.006 cc/g and zeolite A with 0.002 cc/g over the same range. High surface area silica (448 m2/g ASTM standard) has a higher pore volume over the 20 to 500 Angstroms diameter range, but a very different pore size distribution. More than 90% of its pore volume is in pores less than 150 Angstroms in diameter, with no measured additional pore volume between 500 to 2500 Angstrom diameter pores.

These large pores are responsible for causing fast water "swing" capacity at low temperatures making said novel material eminently suitable for use in air to air rotary energy exchanges.

This is surprising since, as well known, sodalite sorbs water only in its zeolite cages and only very slowly.

DESCRIPTION OF THE PREFERRED EMBODIMENTS

The preparation of hydroxysodalite is well known in the art and any convenient method can be used.

In a typical preparation, 300 pounds of water are combined with 90.5 pounds of sodium hydroxide and 50 pounds of a high purity kaolin clay such as ULTRAWHITE 90 supplied by Engelhard Corporation. This mixture is reacted at 95° C. for 20 hours under constant stirring. The resulting material is placed in a filter press and the resulting cake is washed in said filter press with 100 gallons of 95° C. deionized water to yield 70 pounds of filter cake (63.6% solids) which contains high purity hydroxysodalite as confirmed by XRD.

In order to convert the hydroxysodalite into the novel macroporous structure of this invention, it is necessary to treat the same with acid at controlled conditions.

Hydrochloric acid is preferred but other acids such as nitric, sulfuric, etc., can be used.

The hydroxysodalite is treated with concentrated hydrochloric acid (10 molar) at temperatures of from about 85° to about 120° C., preferably 95 ° C. with agitation for approximately one hour.

The amount of hydrochloric acid used is critical in obtaining a product with optimum desiccant properties.

The amount of concentrated (10 molar) hydrochloric acid used ranges from 5 to 7 grams per 25 grams of filter cake (63.6% solids) in 125 grams of deionized water. It is most preferred to use 6 grams of concentrated hydrochloric acid.

Although it is not necessary, the filter cake can be dried prior to acid treatment and the amount of water and acid adjusted accordingly.

Details of the construction of typical desiccant wheels and their mode of operation are known in the art. See U.S. Pat. No. 4,769,053 herein incorporated by reference.

It is preferable to provide our novel heat exchange medium in the form of particles having an average size in the range of about 3 to 10 microns, most preferable about 7 microns. All particle sizes refer to those obtained using the known SEDIGRAPH 5000 particle size analyzer.

To apply the sodalite medium to the substrate we prefer to apply the particulate modified sodalite as an aqueous coating composition containing a suitable water based binder preferably an acrylate adhesive such as NACRYLIC X-4260 supplied by National Starch and Chemical Company. Satisfactory results have been achieved using a mixture of the acrylate with colloidal silica supplied under the trade name NALCOAG 1130. To assure that the coating composition has suitable rheology, one or more dispersants should be incorporated in the coating composition. A condensed phosphate salt (sodium tripolyphosphate) has been used successfully as a dispersant.

The following examples will illustrate this invention.

EXAMPLE 1

Preparation of Hydroxysodalite 300 pounds of water are combined with 90.5 pounds of sodium hydroxide and 50 pounds of high purity kaolin clay identified as ULTRAWHITE 90 supplied by Engelhard Corporation. The resulting mixture is reacted at 95 ° C. for 20 hours under constant stirring. The material is placed in a filter press to form a cake and the cake is washed in said filter press with 100 gallons of 95° C. deionized water to obtain approximately 70 pounds of filter cake (63.6% solids).

A portion of the product was subjected to XRD analysis and the presence of high purity hydroxysodalite was confirmed.

EXAMPLE 2

Preparation of the Novel Sodalite Desiccant 25 grams of the filter cake from Example 1 was slurried with 125 grams of deionized water and 6 grams of concentrated hydrochloric acid and heated under agitation at 95° C. for 1 hour. The pH of the slurry was determined to be 6.60.

The resulting acid treated material was placed in a filter press and the resulting cake was washed in said filter press by passing 100 grams of 95° C. deionized water.

XRD pattern analysis of a portion of said material detected only sodalite.

Elemental analysis on a water-free basis of the products of Example 1 and Example 2 are set forth in the following Table.

TABLE 1

|  | Example 1 | Example 2 |
| --- | --- | --- |
| $Al_2O_3$ | 34.4 wt. % | 38.4 wt. % |
| CaO | <400.0 ppm | <100 ppm |
| $Fe_2O_2$ | 0.65 wt. % | 0.72 wt. % |
| $K_2O$ | 0.82 wt. % | 0.32 wt. % |
| MgO | <1000 ppm | <1000 ppm |
| $Na_2O$ | 21.7 wt. % | 13.6 wt. % |
| $P_2O_5$ | <500 ppm | <400 ppm |
| $SiO_2$ | 40.44 wt. % | 45.1 wt. % |
| $TiO_2$ | 0.58 wt. % | 0.66 wt. % |
| Si/Al (molar data) | about 1 | about 1 |

As can be seen from the above table, there is little difference in elemental analysis between the two samples other than the expected decrease in sodium for the acid treated material of Example 2.

Notwithstanding, the little difference in elemental analysis between Examples 1 and 2, there is a huge difference in properties, performance, and physical appearance.

Figure 1:
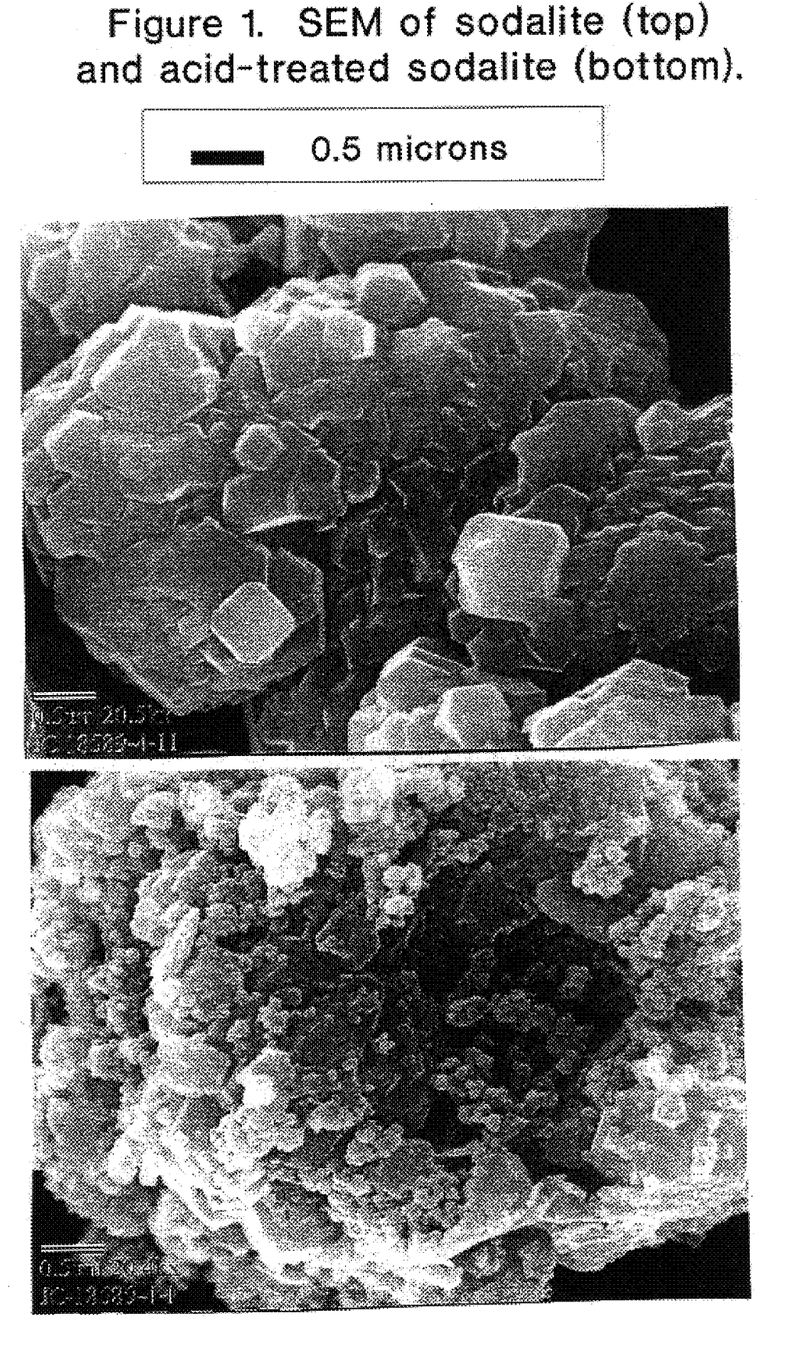
FIG. 1 shows SEM (scanning electron micrographs) of both hydroxysodalite (top) and the novel acid-treated sodalite (bottom) of this invention.

FIG. 1 shows SEM (scanning electron micrographs) of untreated sodalite (Example 1) and acid treated sodalite (Example 2).

As can be seen, acid treatment converts smooth, large sodalite particles (Example 1) into small textured particles that are likely to have high porosity (Example 2).

EXAMPLE 3

Figure 2:
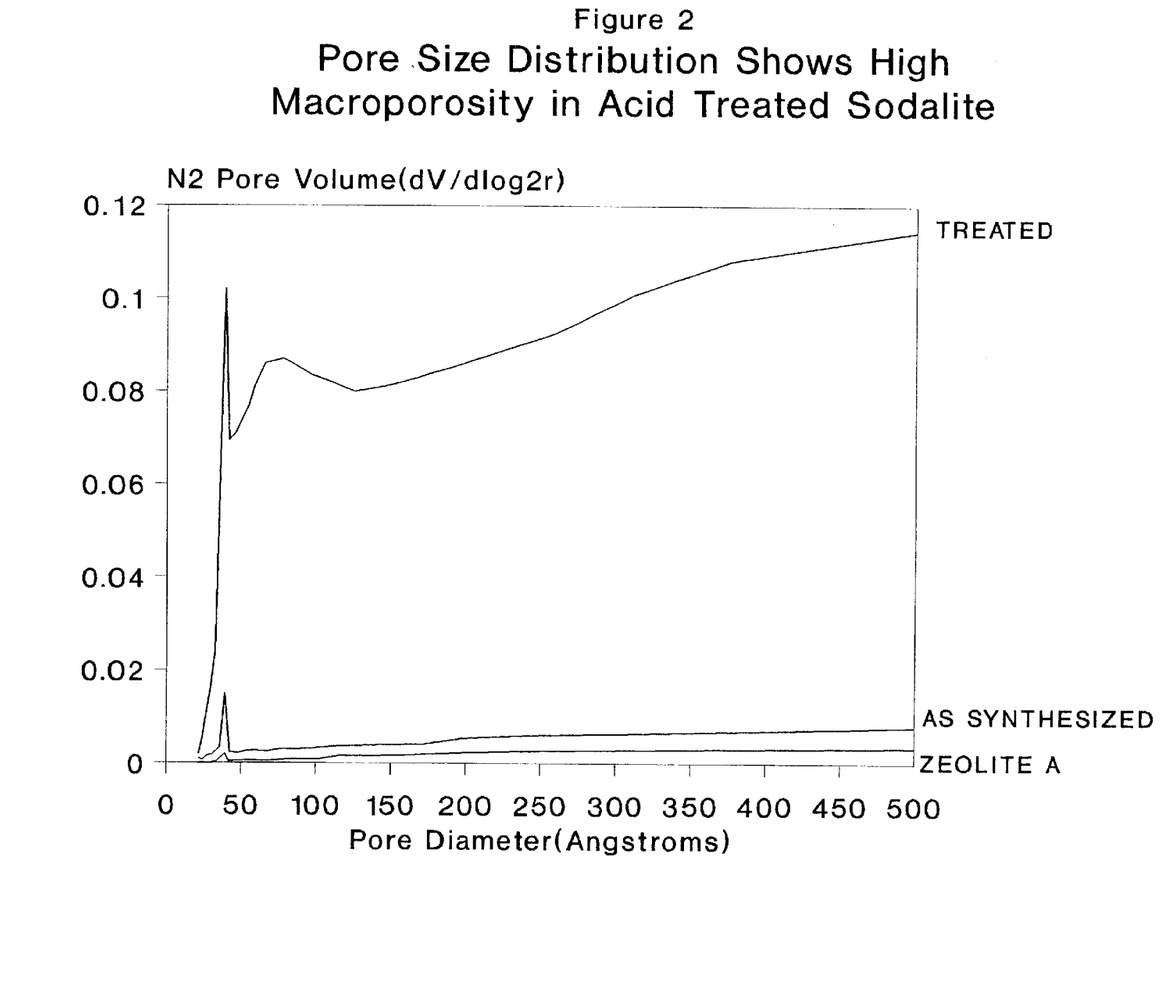
FIG. 2 is a graphical representation of pore size distributions of acid-treated sodalite, untreated sodalite and Zeolite 3A as obtained on a commercial Micrometrics ASA P2400 sorption instrument using common nitrogen desorption isotherm techniques.

Samples of materials of Examples 1, 2 and Zeolite 3A were subjected to nitrogen sorption testing and the results shown in FIG. 2.

Nitrogen sorption tests show that the novel acid treated sodalite of this invention contains pores ranging from 20 to 500 Angstroms in diameter. The sample shown in the pore size distribution data in FIG. 2 has a cumulative pore volume of 0.12 cc/g between said 20 and 500 Angstroms pore diameters. Half of this pore volume is in pores greater than 150 Angstroms diameter. There is an additional 0.03 cc/g more pore volume between 500 to 2500 Angstroms.

This contrasts to sodalite with 0.006 cc/g and zeolite A with 0.002 cc/g over the same range. High surface area silica (448 m2/g ASTM standard) has a higher pore volume over the 20 to 500 Angstroms diameter range, but a very different pore size distribution. More than 90% of its pore volume is in pores less than 150 Angstroms in diameter, less than 10% between 150 and 500 Angstroms diameter, and there is no N2-measurable additional pore volume between 500 to 2500 Angstrom diameter pores.

Acid treated sodalite has no nitrogen detectable micropores (defined here as pores less than 20 Angstroms diameter). It gives a micropore volume of 0.0003 cc/g (i.e., zero). $N_2$ has a 3.6 Angstrom diameter, so what this really means is there are no pores between 20 and 3.6 Angstroms diameter. Experimentally this range is measured using the $N_2$ micropore "t-plot" method (which takes the total porosity and subtracts the macropores), and is commonly used to measure "zeolite surface area" [see Marvin Johnson, J. Catal. (1978), 52(3), 425-31]. Sodalite and Zeolite A also do not show any micropores because their cage openings are also smaller than $N_2$.

EXAMPLE 4

Isopropanol Sorption

Isopropanol has a molecular diameter of 4.3 Angstroms and it was used to confirm the presence of the same macropores that were detected by the nitrogen data of Example 3.

To reassert that acid treated sodalite has significant capacity for polar molecules in pores that are much larger than 3 Å, isopropanol (4.3 Å) was used.

Total isopropanol capacities were compared for sodalite, acid treated sodalite and zeolite 3A. Only acid treated sodalite sorbed the alcohol, 3.1 wt. %. Zeolite 3A and sodalite sorbed only 0.3%. Larger pored zeolites typically sorb 15 wt. % of a small alcohol. The small amount on acid treated sodalite means the alcohol is not sorbed in any zeolite cages because they are too small (for all three samples).

Obviously, the macropores of the acid-treated sodalite is where the isopropanol sorption took place.

EXAMPLE 5

Dodecane Sorption

Dodecane sorption, the ASTM "Spatula Rub" test, is another measure of macroporosity. The minimum diameter of dodecane is 4.0 Angstroms, and it is expected to curl up to an even larger diameter. Acid treated sodalite gives 0.67 lbs oil/1 b solid. This contrasts to 0.37 for sodalite and 0.30 for Zeolite A, due to sticking to the outer surface.

EXAMPLE 6

$CO_2$ Sorption

Zeolite 3A, untreated sodalite (Example 1) and acid treated sodalite (Example 2) were evaluated for the ability to sorb $CO_2$.

The $CO_2$ data show that any zeolitic pores present are smaller than the 3.3 Angstrom diameter of $CO_2$. Only 1 wt. % $CO_2$ sorbs at atmospheric pressure. This is a low $CO_2$ sorption and suggests $CO_2$ sorption is only in macropores; a typical larger pore zeolite like NaX will sorb about 20% $CO_2$ at low pressure due to cage filling and strong interaction of a zeolite cation with $CO_2$. Sodalite and zeolite 3A sorb even less $CO_2$, <0.05 wt. %, because they don't have any macropores.

SUMMARY OF THE DATA OBTAINED IN EXAMPLES 1–6

The above data show a material with unexpected macropores between 20 to 500 Angstrom diameters, and no nitrogen-detected pores between 20 and 3.3 Angstroms. Water sorption data will show there are also a lot of micropores less than 3.3 Angstroms. These are sodalite cage openings, which are 2.2 Angstroms (Breck, "Zeolite Molecular Sieves", John Whiley & Sons, 1974 at page 89). Water is 2.6 Angstroms. Surprisingly, sodalite has water sorption, but it is very slow. It relies on water polarization to occur at all (Breck, p.89). Fast "swing" sorption occurs only on macropores.

Other materials such as silica have much higher total macropore capacities than acid treated sodalite, so will sorb more water. However, acid treated sodalite has better "swing" because it has even larger pores than silica and these pores are lined with unique chemical sites. This combination fortuitously gives a preferred combination of properties that is needed for good water swing behavior.

WATER SORPTION DATA

Sodalite, acid treated sodalite and zeolite 3A all have high total water capacities due to their zeolite components. The total water capacity for acid treated sodalite is at least ⅔ that of sodalite itself. 3A zeolite is comparable to sodalite. These total capacities do not explain "swing" behavior. The "swing" water does not include water contained in sodalite cages because cage diffusion is too slow to "swing".

In order to measure "swing" behavior, a test method was devised.

The test method was developed on a Rheometrics (brand) STA/Thernal gravimetric analyzer utilizing that characteristic of an enthalpy wheel desiccant with the ability to adsorb and desorb water to support the development of this new material.

The STA has been employed to screen and identify the materials with the optimum adsorptive swing capacity and performance compared to the competitive products used in enthalpy wheel applications. This test is also useful as a quality assurance measure for acid-treated sodalite prior to the coating of desiccant wheels.

This method measures water adsorption and desorption as a function of temperature in 20 minute cycles from 27 to 35° at partial pressure of 22 Torr. These conditions correspond to an enthalpy wheel's desiccant performance. Weight loss and recovery determinations are made on a Rheometrics STA with a gravimetric balance under a constant helium flow. Approximately a 15–20 mg sample is loaded onto the balance. The heating steps used for these experiments are listed in the table below.

TABLE 2

| STA/TGA CYCLIC WATER ADSORPTION METHOD |
|---|
| 1. Ramped from 27° C. to 120° C. with a 10° C./min. helium flow |
| 2. Held isothermal at 120° C. for 20 mins. |
| 3. Ramped from 120° C. to 35° C. at 10° C./min. |
| 4. Activation in continuous water and helium flow |
| 5. Held isothermal at 35° C. for 20 mins. |
| 6. Ramped from 35° C. to 27° C. |
| 7. Held isothermal at 27° for 10 mins. |
| 8. Ramped from 27° to 35° C. (repeat) Cycled 22 times |

EXAMPLE 7

Swing Data

The untreated sodalite of Example 1, the acid treated sodalite of Example 2 and the Zeolite 3A were subjected to the STA/TGA test above described. The results are set forth in the table below.

TABLE 3

|  | Wt. % of Water Swing |
|---|---|
| Example 1 | 0.1 |
| Example 2 | 2.8 |
| Example 3A | 0.8 |

As can be seen, the above data shows a totally unexpected superiority in performance for the novel desiccant of this invention. It outperformed Zeolite A by better than 300%.

EXAMPLE 8

Isotherm Data

Figure 3:
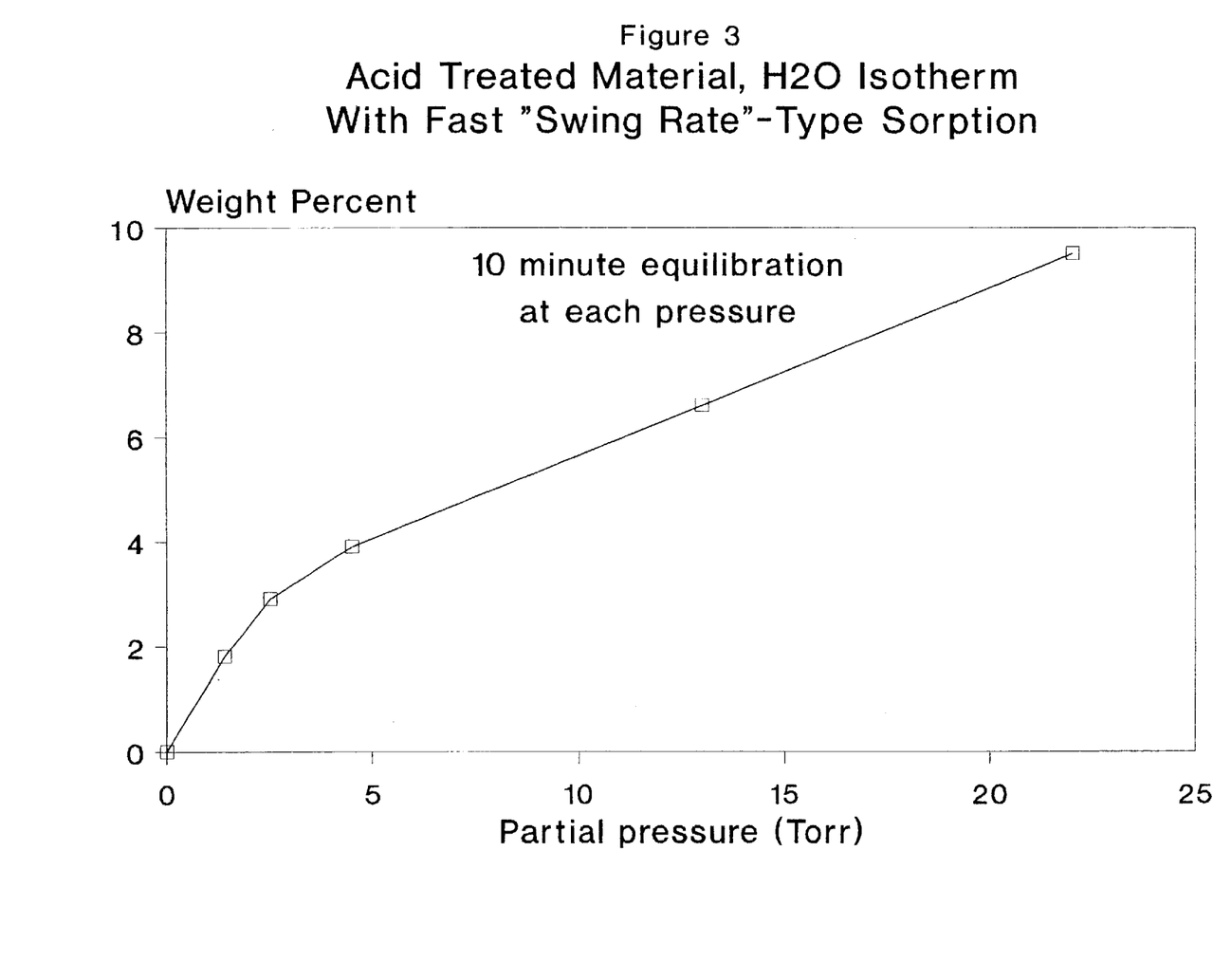
FIG. 3 is a water adsorption isotherm for acid-treated sodalite using a 10 minute equilibrium time.
Figure 4:
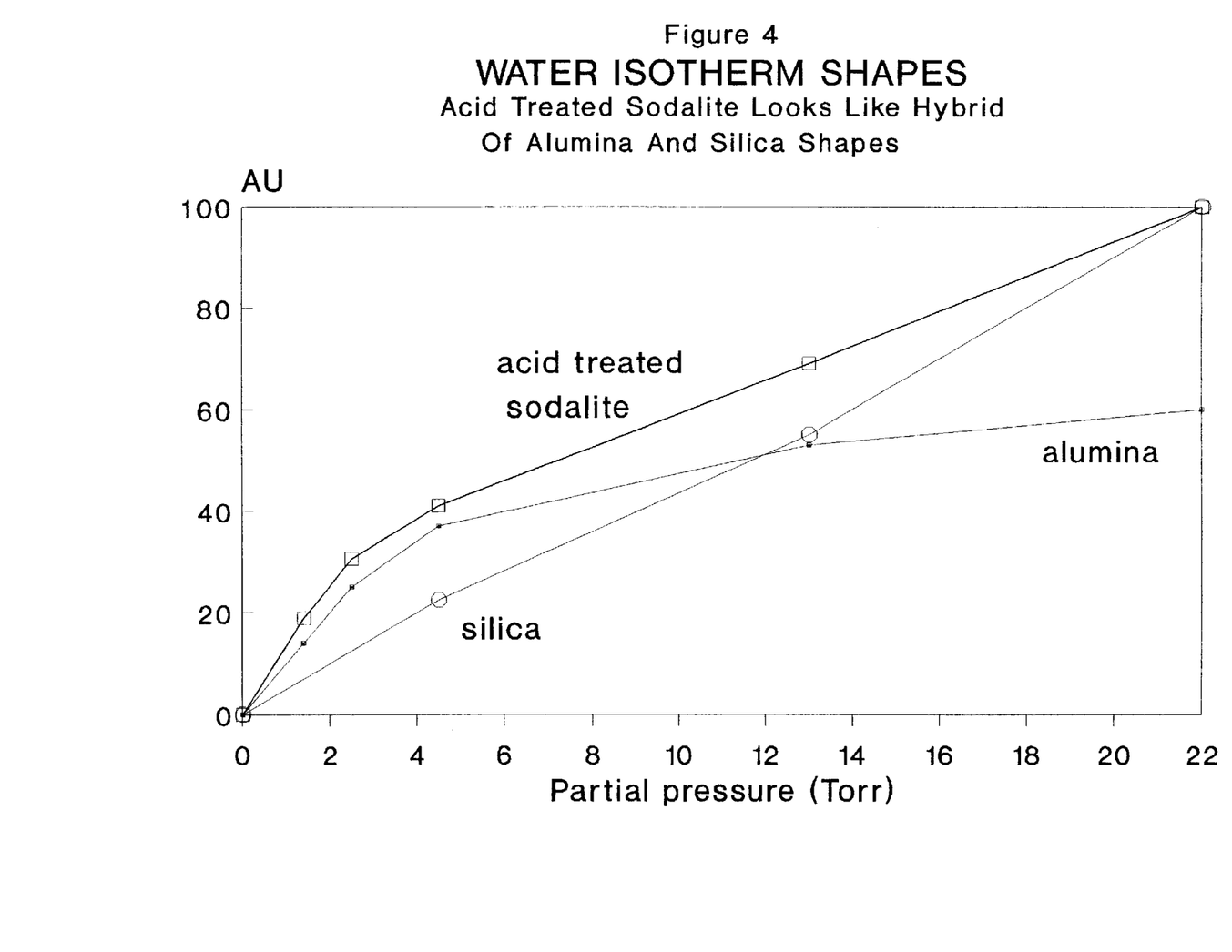
FIG. 4 contains the same water adsorption isotherm of FIG. 3, along with those for silica and alumina. It shows the acid-treated sodalite represents typical desiccants of the prior art and is a combination of typical alumina and silica isotherms.
Figure 5:
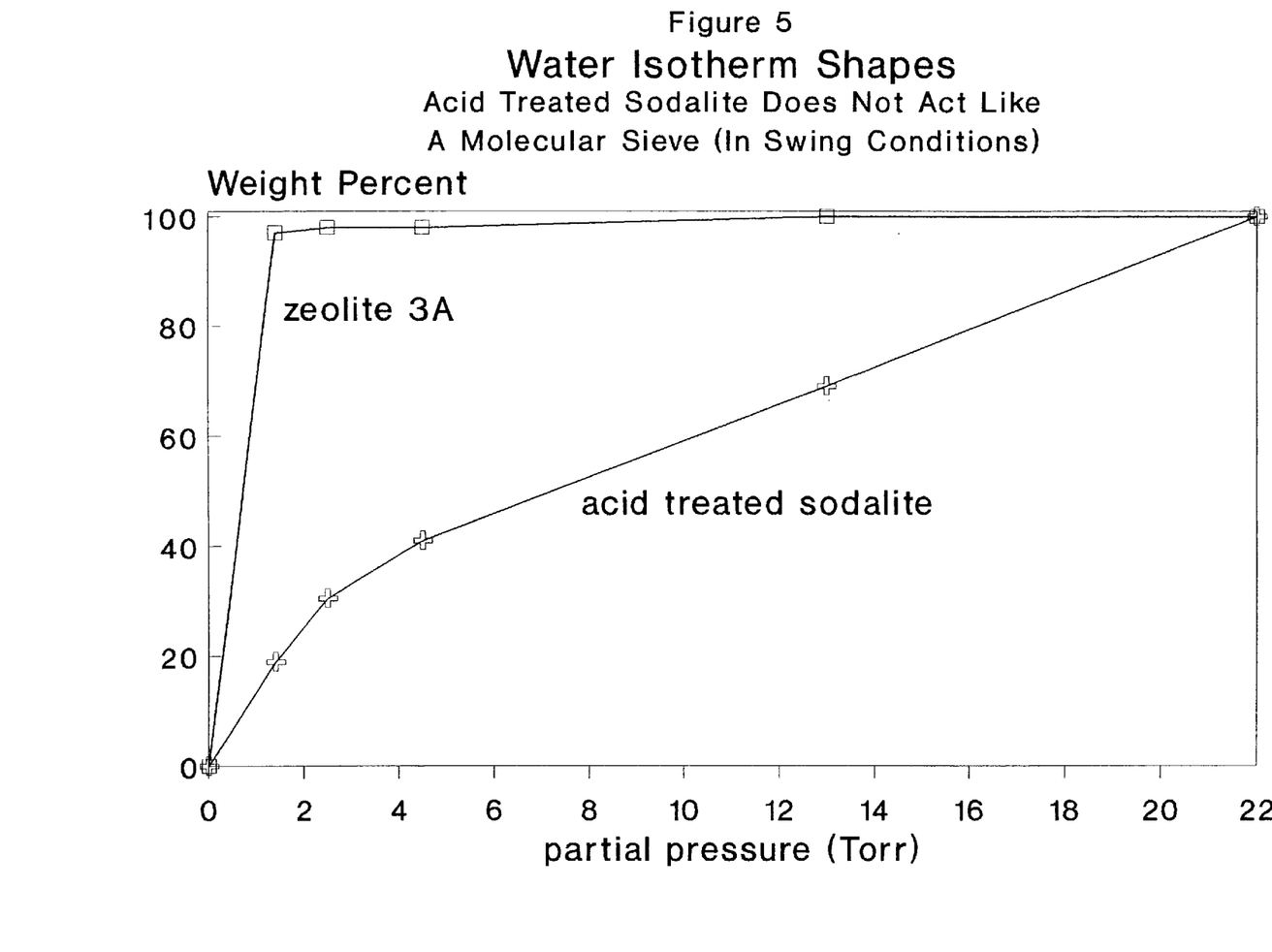
FIG. 5 contains water adsorption isotherms for both Zeolite 3A and acid-treated sodalite under swing conditions.

For use in a total enthalpy wheel, water "swing" is necessary, meaning the water will be rapidly adsorbed then desorbed. This cycle is about 20 minutes, 10 minutes each for adsorption and desorption. To understand what is really happening in this time frame, we modified the usual isotherm measurement procedure to mimic a swing test for the new product. The water adsorption isotherm for the new product using a 10 minute equilibration time, FIG. 3, is typical of a desiccant. It is a combination of typical alumina and silica isotherms, FIG. 4. This means this material, an aluminosilicate, acts like a hybrid of both alumina and silica. At low partial pressures, 0–6 Torr, where surface chemistry and microporosity dominates, it acts like an alumina, with slight curvature like alumina. It has much less curvature than a zeolite would have (see FIG. 5); there is no zeolitic adsorption in this time frame. At high partial pressures, 6–22 Torr, where macroporosity dominates an isotherm's behavior, the isotherm is linearly increasing, similar to a silica. Note that for an alumina, a typical isotherm would be leveled off in this range.

Figure 6:
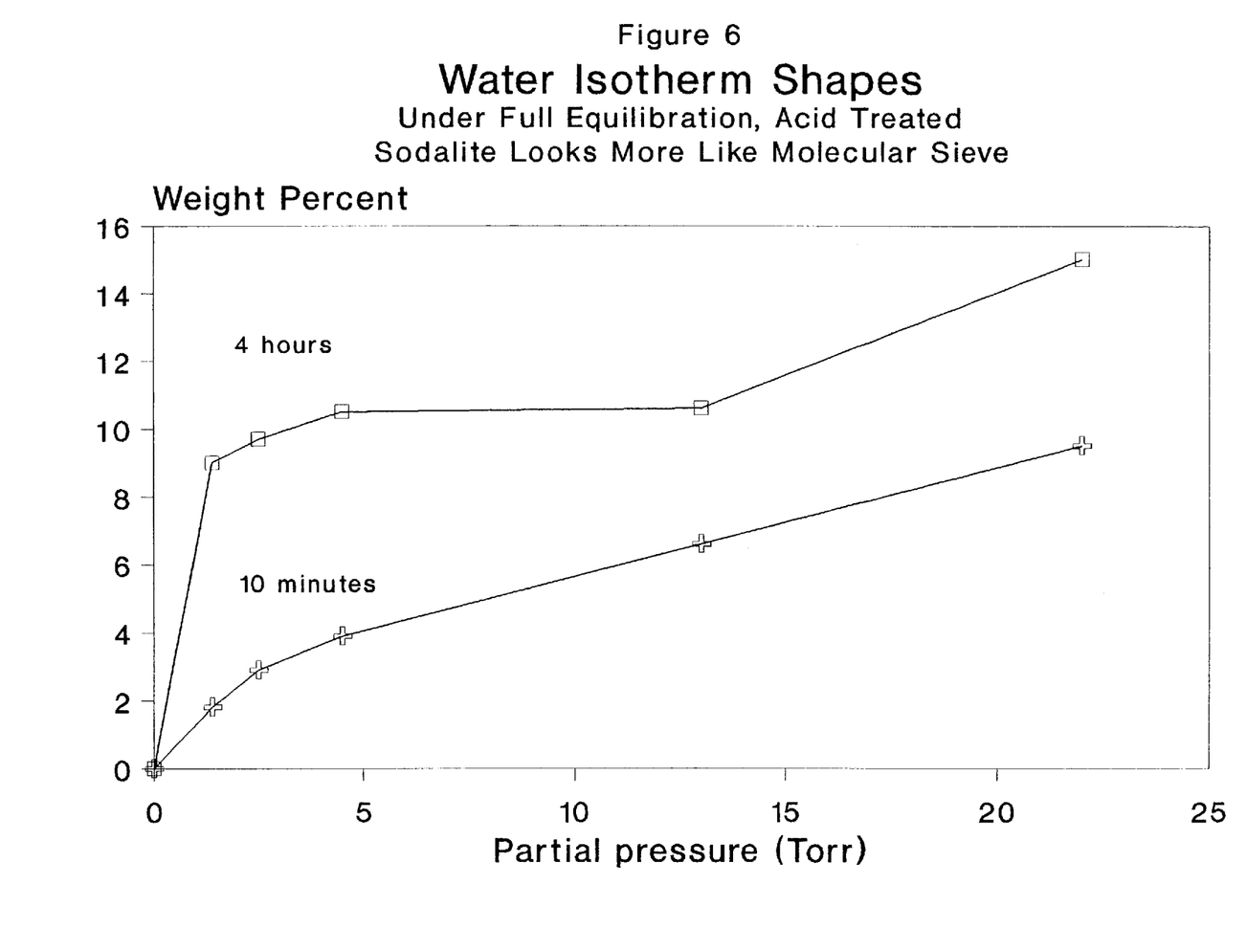
FIG. 6 contains water adsorption isotherms for acid-treated sodalite at 10 minutes and at 4 hours (full equilibrium).

To reach full equilibrium, water sorption on acid treated sodalite takes 4 hours. The resultant isotherm now shows sodalite cage/zeolitic sorption: the lower end of the isotherm, corresponding to the smallest pores present, has increased due to slow adsorption of water into sodalite cages, FIG. 6. The zeolite sorbs about 7 out of the total weight percent water picked up by the sample.

A parallel, qualitative observation is that if treated and untreated sodalite are heated side by side at 1 degree per minute under vacuum, the initial weight loss of water is 10 times faster for the acid treated sample up to about ⅓ of its total water weight loss. This is water in the larger macropores.

SUMMARY OF WATER SORPTION DATA EXAMPLES 7 & 8

For desiccant wheel applications, the water of interest is the water that can "swing", meaning the water that quickly sorbs and desorbs. This is some fraction of the total water held by the sample. Under the expected operating conditions for this new material (high partial pressures and low temperatures) the zeolite cages will be saturated with water that does not swing: it stays in place indefinitely. The "swing" water is in the macropores that are unique to the acid treated sodalite.

A fully equilibrated water sorption isotherm for acid treated sodalite is not characteristic of a pure molecular sieve or zeolite (not a Type 1 isotherm).

The shape of the isotherm is unusually sensitive to the equilibration time allowed. At short times it looks like a desiccant. At long times it looks like a combination of a desiccant and a zeolite.

The isotherm shapes are all consistent with a broad range of pore sizes being present from 2.2 to 500 or bigger Angstroms diameter.

EXAMPLE 9

The procedure of Example 2 was varied in order to test different concentrations of concentrated hydrochloric acid (10 molar) and a heating to a different temperature.

The testing involved two sets of experiments, one set carried out at 80° C. and the other at 95° C. Final pH and average water sorbed were determined as in Example 2.

The testing conditions and the results obtained are listed in the following table.

TABLE 4

| | pH | Average Water Adsorbed in Weight % |
|---|---|---|
| 80° C. gram of HCl added | | |
| 0 | 12.05 | 0.13 |
| 2 | 8.43 | 0.33 |
| 3 | 7.45 | 1.02 |
| 4 | 7.03 | 1.34 |
| 5 | 6.45 | 1.50 |
| 7 | 4.43 | 1.00 |
| 8 | 3.11 | 0.73 |
| 10 | 1.88 | 0.38 |
| 95° C. Grams of HCl added | | |
| 4 | 7.17 | 1.55 |
| 5 | 6.89 | 1.89 |
| 6 | 6.60 | 2.63 |
| 7 | 6.21 | 1.87 |
| 8 | 5.43 | 1.23 |
| 9 | 4.80 | 1.04 |
| 10 | 4.26 | |
| 11 | 3.87 | |

As can be seen from the above table, treatment at 80° C. did not provide a material with optimum performance.

It would appear that satisfactory performance can be obtained at a final pH of 6.21–6.80 at temperatures greater than 80° C. Optimum performance was obtained at a pH of 6.60 (Example 2).

Figure 7:
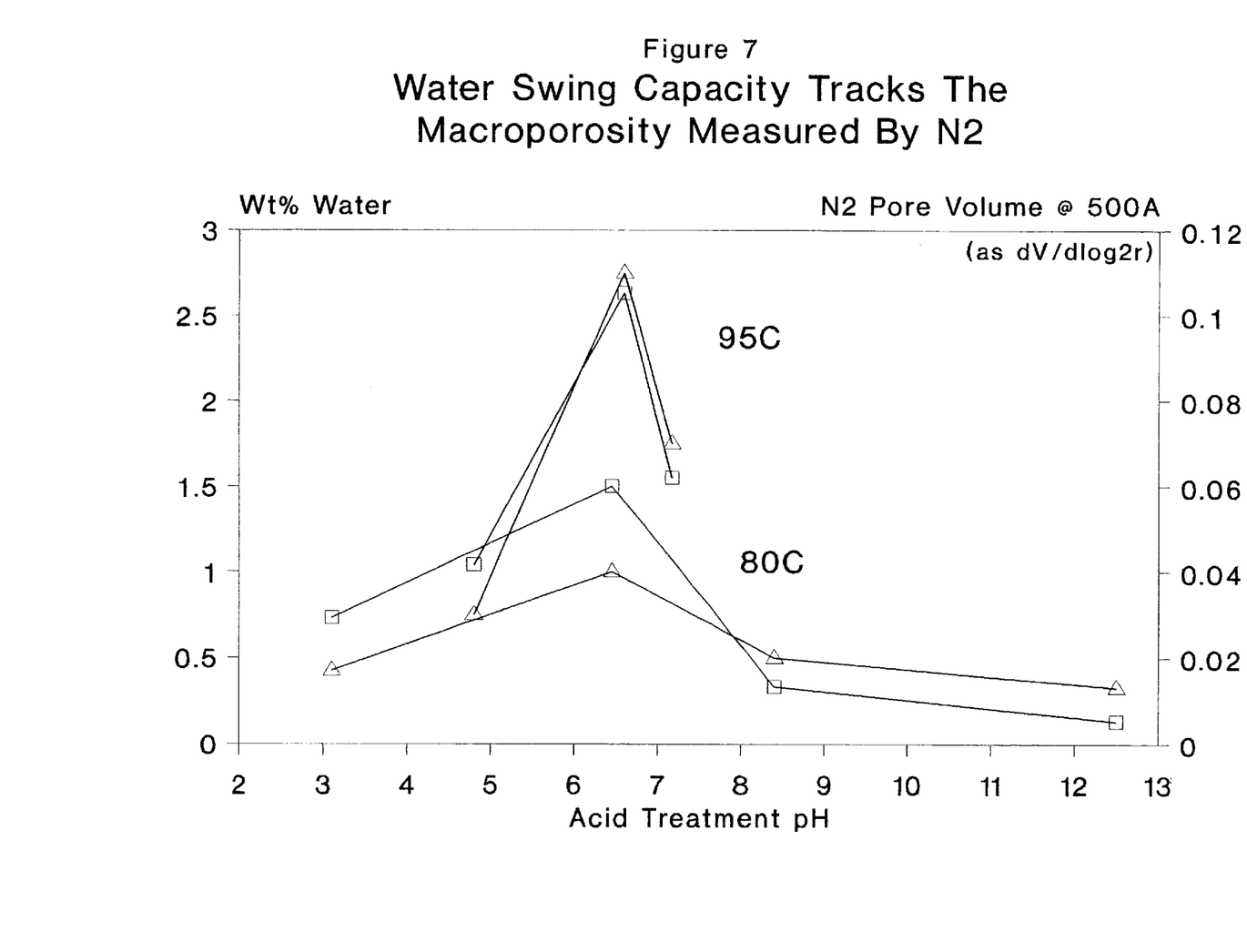
FIG. 7 is a graphical representation of nitrogen desorption isotherm data (dV/dlog2r at 500 Angstroms) of samples of acid treated sodalite compared to their water swing capacities.

FIG. 7 represents water swing capacity vs. number of 500 angstrom pores in the novel acid treated sodalite.

The samples treated at 80° C. to a pH of 3.11, 6.45 and 8.43 as well as untreated sodalite were tested for water swing capacity and the 500 angstrom pore volume was also measured.

As can be seen from FIG. 7, there is a definite correlation between large pores present and water swing capacity irrespective of whether the acid treatment occurs at higher (95° C.) or lower temperatures (80° C.).

EXAMPLE 10

This example will illustrate techniques for coating the novel acid treated sodalite on an enthalpy wheel.

A 70-pound sample of acid leached sodalite was provided from batches of hydroxysodalite reacted with hydrochloric acid to pH about 6.7, washed with 100 gallons of DI water (100° C.) and filtered to form a cake at about 42% solids.

A batch (58.7 lbs.) of washed filter cake was mixed thoroughly with 95.30 lbs. DI water in a Cowles mixer, followed by 20 minutes in a Ross mixer set at 50 Hz. The average particle size is 7 microns. To this mixture, add 1.0 lb. of NACRYLIC x-426 binder and 0.83 lb. of NALCO 1130 Colloidal Silica and 45.4 grams of Sodium Tripolyphosphate (ALDRICH). Mix the slurry well. The resultant slurry was dip coated on a HEXCEL honeycomb. On a HEXCEL wheel weighing 306 grams, 293 grams was coated. The wheel was dried at 72° F. at 36% humidity.

We claim:

1. A particulate desiccant having a Si/Al molar ratio of about 1/1, exhibiting XRD with peaks characteristic of sodalite, bulk density lower than sodalite, porosity in excess of that sodalite and having a cumulative pore volume of at least 0.04 cc/g contributed by macropores in the size range of 20 to 500 Angstrom pore diameter.

2. The desiccant of claim 1 which has a textured appearance substantially as shown in FIG. 1.

3. The desiccant of claim 1 wherein the rate of cyclic water adsorption and desorption below 200° F., under $10^{-3}$ Torr vacuum is at least 2 times faster than for hydroxysodalite for at least ⅓ the water present.

4. A gas permeable matrix formed of a sensible and latent heat exchange material providing passageway through which an air stream can flow through the sensible and latent heat exchange material and a layer of a coating composition comprising the desiccant of claim 1 applied to at least a portion of the surface of said sensible heat exchange material.

5. A total energy recovery wheel comprising the dessicant of claim 1.

6. Acid treated sodalite having the Si/Al molar ratio of sodalite, the XRD of sodalite, bulk density below, and having a cumulative pore volume of at least 0.04 cc/g contributed by macropores in the size range of 20 to 500 Angstrom pore diameter.

7. The acid treated sodalite of claim 6 which has the textured appearance as shown in FIG. 1.

8. The acid treated sodalite of claim 6 which has a cumulative pore volume of at least 0.08 cc/g contributed by pores in the size range of 20 to 500 Angstrom diameter.

9. The acid treated sodalite of claim 6 which has a cumulative pore volume of at least 0.12 cc/g contributed by pores in the size range of 20 to 500 Angstrom diameter.

10. A total enthalpy system comprising the particulate desiccant of claims 1 or 6, coated on the surface of a honeycomb.

11. The system of claim 10, wherein said system is in the form of a wheel.

12. The system of claim 11, wherein said honeycomb is composed of a plastic.

* * * * *